ROLLER PUMP HEADS

Original Filed Aug. 20, 1968 3 Sheets-Sheet 1

ROLLER PUMP HEADS

Original Filed Aug. 20, 1968 3 Sheets-Sheet 2

United States Patent Office

Re. 27,376
Reissued May 30, 1972

27,376
ROLLER PUMP HEADS

Robert E. Pickup, Norristown, Pa., assignor to Extracorporeal Medical Specialties, Inc.

Original No. 3,502,034, dated Mar. 24, 1970, Ser. No. 735,935, Aug. 20, 1968. Application for reissue Oct. 7, 1970, Ser. No. 78,726
Int. Cl. F04b *43/08, 43/12, 45/06*
U.S. Cl. 417—477 10 Claims

Matter enclosed in heavy brackets [ ] appears in the original patent but forms no part of this reissue specification; matter printed in italics indicates the additions made by reissue.

ABSTRACT OF THE DISCLOSURE

A roller pump of the type having one or more flexible tubular pumping chambers continuously and successively depressed uni-directionally by traveling pumping members wherein improved head arrangements are provided to facilitate replacement of the pumping tubes and removal of the pumping member rotor.

Background of the invention

The claimed invention relates to the field of power driven pumps used to convey fluids wherein the fluid being pumped is forced through a flexible tubular chamber by pumping members mounted for travel in uni-directional depressing contact with the tubular chamber. Pumps of this general type are capable of a wide variety of uses, but are particularly useful in pumping sensitive fluids—such as blood—at slow, carefully controlled rates and pressures in critical environmental settings such as those encountered in the medical profession.

Prior to the present invention, pumps of this general nature have been used for many years. Arnold Patent 2,406,485 illustrates the basic principle of using a flexible tubular pumping chamber stretched over triangularly arranged rollers on a power rotated head. Henry Patent 2,035,159 illustrates a T-shaped anchoring slot for a flexible tubular pumping chamber, and Daniels Patent 2,955,543 illustrates a removable roller head secured to a drive member by a wing nut arrangement. None of these prior disclosures, however, even appreciates—let alone tries to solve—the problems solved by the present invention.

The most advanced type of such pump heretofore commercially available has been manufactured by The Holter Company at Bridgeport, Pa., and sold by Extracorporeal and Medical Specialities Company, Incorporated, Mt. Laurel Township, N.J., a typical unit being illustrated in advertising literature of the latter company in, for instance, a sheet entitled "Micro Bilateral Roller Pump" coded HP2–1166. While this pump was considered by those in the medical profession to be far superior to anything previously or contemporaneously available, it nevertheless had certain drawbacks in connection with replacement of the pumping tubes and removal of the pumping member rotor. The pumping tubes or chambers must be anchored at each end with appropriate fittings in stationary clamping blocks in a manner which secures each end of the tube against longitudinal and rotary motion but without pinching or sharply bending the tube. While this was accomplished in the prior pump referred to above, an upper clamping block had to be secured to a lower clamping block by means of a threaded screw member which was awkward and time-consuming to remove, and was capable of being lost. The roller head had to be secured to its vertically protruding drive shaft by a lateral set screw or other means which was cumbersome and time-consuming to manipulate.

Thus, the problems heretofore unsolved by the prior art were the provision of anchoring means for the flexible pumping tubes which would properly hold the tubes against longitudinal and rotary motion, but which permitted quick, easy and fool-proof insertion and removal of the tubes.

Summary of the invention

This invention provides a roller pump of the type having at least one resilient tubular pumping chamber and at least one pumping member mounted for travel in uni-directional depressing contact with the chamber, and means forming a longitudinal slot the outer end of which meets a lateral shoulder against which a flanged fitting fixed on the tube may be received and the inner longitudinal end of the slot flaring smoothly outward, the width of the slot along its base being at least slightly greater than the width of the tube and the slot remote from its base being slightly narrower than the width of the tube to permit easy insertion and removal of the tube. The lateral shoulder is conveniently at the base of a lateral cross-channel intersecting the outer end of the slot so that a flanged tube fitting having a lateral projection will cooperate with the cross-channel to prevent axial rotation of the tube. The pumping members are eccentrically spaced on a power driven rotor, and each includes roller means having first and second axially spaced tube depressing portions with convex tube-centering configurations.

Brief description of the drawings

Numerous advantages of the present invention will become apparent to one skilled in the art from a reading of the detailed description in conjunction with the accompanying drawings wherein similar reference characters refer to similar parts and in which.

Detailed description

Figure 1:
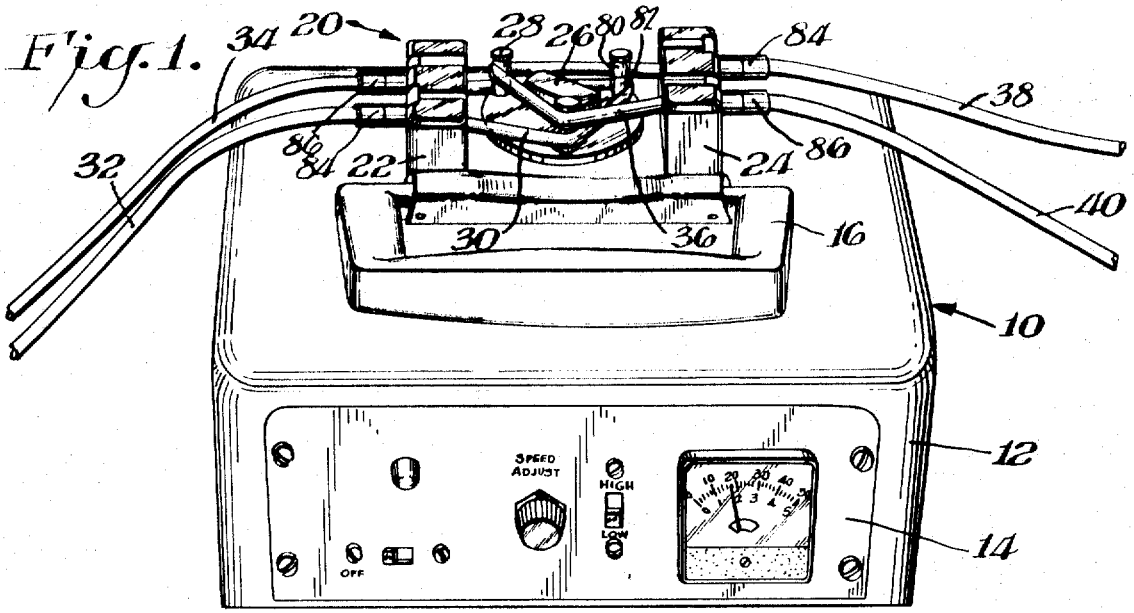
FIG. 1 is a front perspective view of a roller pump showing one embodiment of the roller pump head of this invention.
Figure 2:
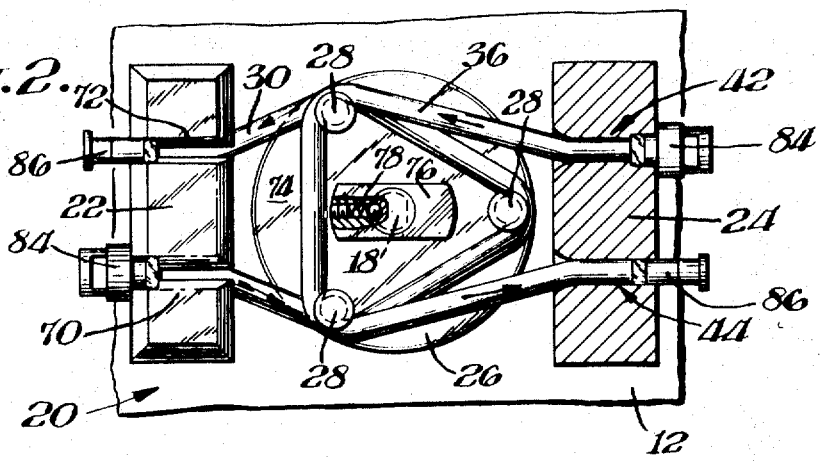
FIG. 2 is a fragmentary plan view, with parts broken away, showing the roller pump head of FIG. 1.
Figure 3:
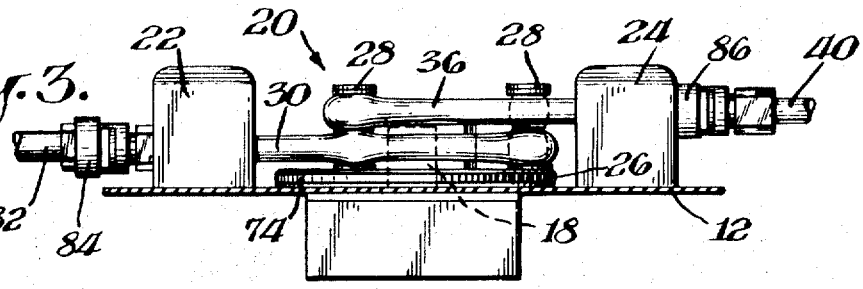
FIG. 3 is a fragmentary sectional elevational view showing the roller pump head of FIG. 1.
Figure 4:
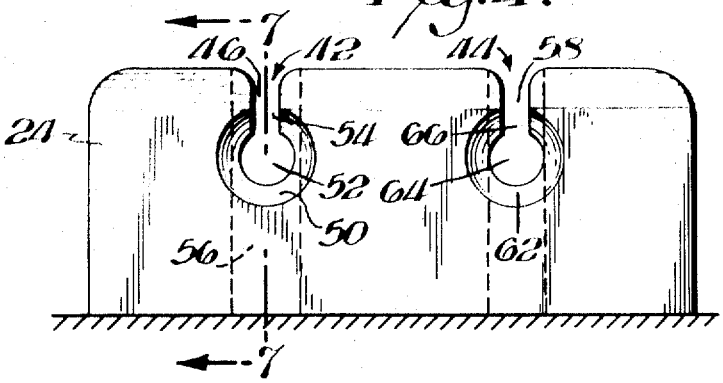
FIG. 4 is an enlarged elevational view showing the inside face of one tube anchoring block.
Figure 6:
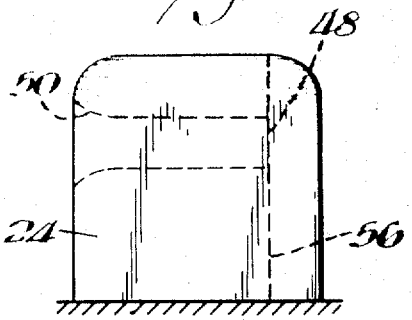
FIG. 6 is an enlarged elevational view showing one end of the tube anchoring block.
Figure 5:
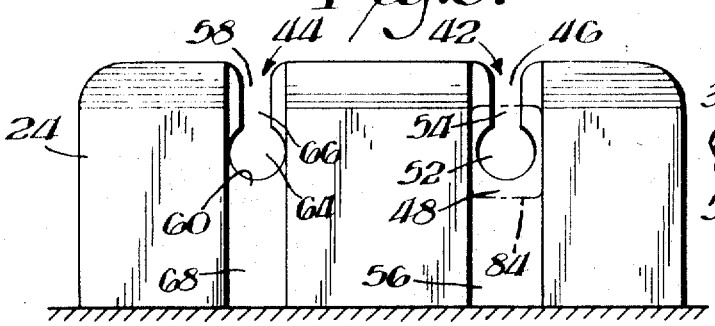
FIG. 5 is an enlarged elevational view showing the outside face of the tube anchoring block.
Figure 7:
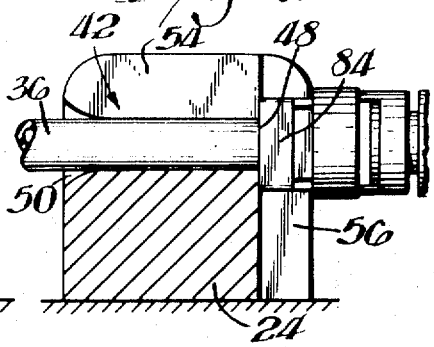
FIG. 7 is an enlarged sectional elevational view on line 7—7 of FIG. 4 showing the tube anchoring block with a pumping tube in place.

Referring more particularly to the drawings, one embodiment of the present invention is illustrated in FIGS. 1–7, the roller pump unit 10 being illustrated in FIG. 1. The pump comprises a main housing 12 having an instrument panel 14 secured to the front face and a foldable handle 16 secured to the top. The main housing 12 contains an electrically powered drive motor, a speed eduction gear box, speed indicating mechanism, and ther related controls which per se form no part of the resent invention. A rotatable drive shaft 18 protrudes ertically upwardly through the top of the housing 12 for onnection with the pumping member rotor, as explained elow.

Mounted on top of the housing 12 is the pump head 20 vhich comprises a lower tube anchoring block 22 on one ide, an upper tube anchoring block 24 on the other side, nd therebetween a power driven rotor 26 having three ccentrically spaced pumping members 28. The lower ube anchoring block 22 holds both ends of a resilient umping tube 30 which in turn is connected to an inflow onduit 32 and to an outflow conduit 34. The upper tube nchoring block 24 holds both ends of another resilient umping tube 36 which in turn is connected to an inflow onduit 38 and to an outflow conduit 40.

The upper tube anchoring block 24 includes an inflow tation 42 and an outflow station 44. The inflow station ncludes easily accessible structure forming a longitudinal lot 46, the outer longitudinal end of the slot 46 meeting lateral shoulder 48 against which a flanged fitting fixed n the resilient tube 36 may be received to anchor the nflow end of the tube against inward axial motion. The nner longitudinal end of the slot flares smoothly outvard as at 50 to avoid sharp corner contact with the ube 36 in the slot. The width of the slot along its base, s at 52, is at least slightly greater than the width of the ube 36 so that the tube is freely received herein. The slot emote from its base, as at 54, is slightly narrower than he width of the tube so that the tube is normally retained long the base of the slot.

The shoulder 48 is formed as the base of a lateral crosshannel 56 which intersects with the outer longitudinal nd of the slot 46. The width of the channel 56 is greater han the width of the slot at its base 52, and is adapted o receive a lateral projection on the flanged tube fitting o prevent axial rotation of the tube relative to the slot, he projection in this case being a rectangular flange havng a width only slightly narrower than the width of the hannel.

The outflow station 44 includes a slot 58 similar to nd spaced from the slot 46 of the inflow station. It ncludes at its outer longitudinal end a lateral shoulder 0, and its inner longitudinal end flares smoothly outvard as at 62 to avoid sharp corner contact with the ube in the slot. The width of the outflow station slot 58 long its base, as at 64, is at least slightly greater than he width of the tube, and the slot remote from its base, s at 66, is slightly narrower than the width of the tube. he abutment surface or shoulder 60 is provided by the ase of a lateral cross-channel 68, the width of which approximately equal to the width of the slot 58 at its ase 64. The narrower channel 68 cooperates with a ateral projection on the flange fitting—in this case also rectangular flange—fixed on the outflow end of the ube, the flanged fitting being of a different size or conguration than the fitting fixed to the inflow end of the ube and designed to cooperate with the wider lateral ross-channel 56 at the inflow station.

The two slots 46 and 58 are arranged substantially arallel to each other and spaced apart a distance no reater than three times the radial eccentricity of the umping members 28 on the power driven rotor 26. The ase of each slot lies in a common plane which is perendicular to the axis of the rotor 26.

The lower tube anchoring block 22 is identical to the pper tube anchoring block 24 just described, except at the depth of the inflow slot 70 and the outflow slot 2 is greater than the depth of the corresponding slots 6, 58. This causes the pumping tube 30 anchored in the lock 22 to be positioned lower than the pumping tube 6 anchored in the block 24 as both tubes are trained round the pumping members 28 on the rotor 26, as exlained below.

The rotor 26 comprises a single circular plate portion 74 with an upstanding central boss 76 having an axial aperture to receive the upper end of the power driven shaft 18. A spring loaded detent arrangement 78 engages a cooperating annular groove in the shaft 18 to prevent axial displacement of the rotor 26 from the shaft 18, and the aperture in the rotor includes a flat or other keyway arrangement which cooperates with the shaft 18 to insure that the rotor and the shaft turn together. The aperture in the rotor does not extend through the top of the upstanding central boss 76, which may have a smooth upper surface, preventing any accidental leakage of fluid along the shaft 18 and into the housing 12.

The three pumping members 28 take the form of rollers or spools and are mounted eccentrically of the shaft 18 on the flat plate portion 74, and each pumping member 28 includes roller means of hourglass configuration to provide first 80 and second 82 axially spaced tube-depressing portions, each portion having a convex tube-centering configuration. The hourglass or convex portions 80 insure that the upper pumping tube 36 is properly maintained in an upper plane perpendicular to the rotor axis and spaced slightly above the lower parallel plane occupied by the lower pumping tube 30 trained around the lower convex portions 82 of the rollers 28.

The pumping tubes 30, 36 are similar, although tubes of different diameters may be utilized to pump two different fluids at two different rates simultaneously. Each tube has a flanged fitting 84 fixed thereto at its inflow end, and a different flanged fitting 86 fixed to its outflow end. Each flanged fitting 84, 86 includes a lateral projection which cooperates with the corresponding lateral cross-channel on the outer surface of the tube anchoring blocks 22, 24 except the inflow end flanged fitting is larger and cooperates with the wider cross-channel 56 whereas the outflow end fitting 86 is smaller and cooperates with the narrower cross-channel 68. This insures that the inflow and outflow conduits connected to a given pumping tube will not be inadvertantly installed backwards in the tube anchoring block, which obviously would cause fluid to be pumped in a direction opposite to the one desired. The pumping tubes are molded to a length of silicon rubber, and are extremely resilient having excellent "memory" and ability to be sterilized for repeated use. For pumping low volumes of fluid, the portions of the tubes contacted by the rollers may be molded of smaller diameter than the ends of the tubes which cooperate with the slots at the inflow and outflow stations, as is apparent. When two tubes 30, 36 are employed and anchored in the opposed blocks 22, 24, unbalanced lateral strain on the rotor axis is minimized or eliminated.

In operation, with an inflow conduit 38 attached by means of a fitting 84 to the flow end of a pumping tube 36, and an outflow conduit 40 attached by means of a fitting 86 to the outflow end of the pumping tube 36, the pump operator simply grasps the pumping tube in one hand and the fitting 84 in the other, and with a gentle stretching action the tube is moved laterally into the open slot 46 at the inflow station 42 with a smooth snap action until the tube lies loosely trapped along the widened base 52 thereof. The other end of the pumping tube is similarly inserted in the slot 58 of the outflow station 44. The intermediate portion of the pumping tube 36 is thereafter trained or stretched around the upper convex portions 80 of the three pumping members 28, and is otherwise unsupported between the inflow station 42 and the outflow station 44. Power operated rotation of the rotor 26 (counterclockwise in FIG. 2) serves to move fluid through the pumping tube 36, pumping it from the inflow conduit 38 to the outflow conduit 40.

Figure 8:
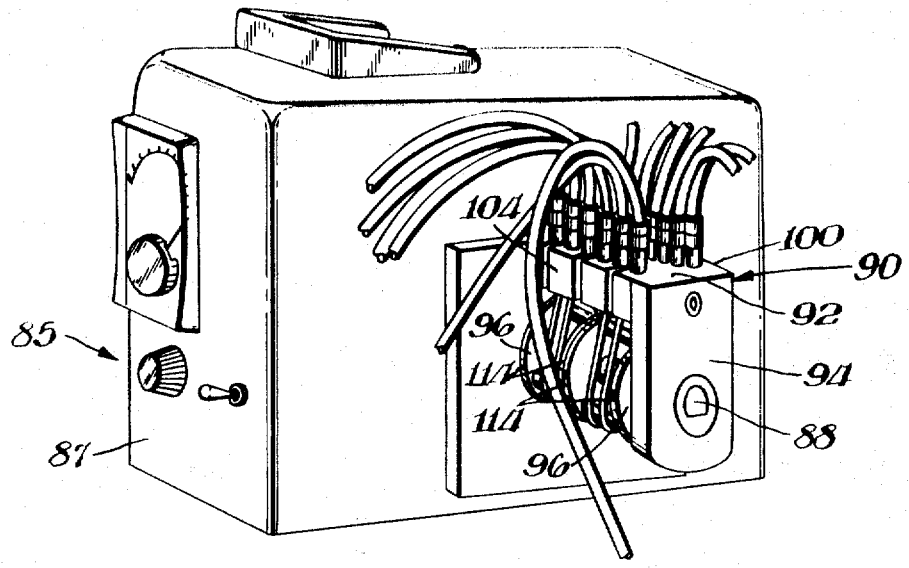
FIG. 8 is a perspective view of a roller pump showing another embodiment of the roller pump head of this invention.
Figure 9:
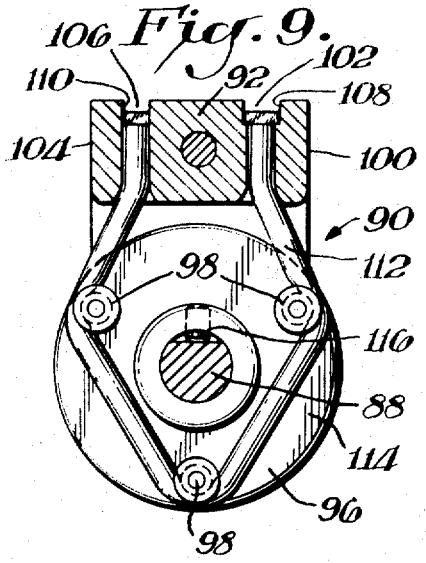
FIG. 9 is a fragmentary sectional elevational view showing the roller pump head of FIG. 8 with a pumping tube in place.
Figure 10:
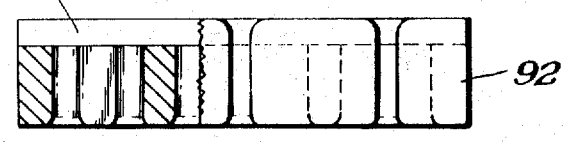
FIG. 10 is a side elevational view showing the tube anchoring block.
Figure 11:
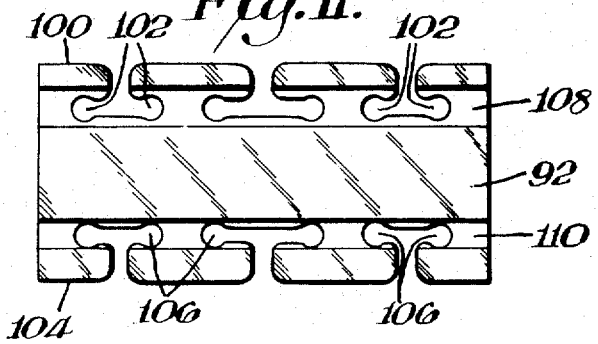
FIG. 11 is a plan view showing the tube anchoring block.

Another embodiment of the present invention is illustrated in FIGS. 8–11, the roller pump unit 85 being illustrated in FIG. 8. The pump comprises a main housing 87 having an instrument panel secured to the front face. As in the above described unit 10, the main housing 87 contains an electrically powered drive motor, a speed reduction gear box, speed indicating mechanism, and other related controls which per se form no part of the present invention. A drive shaft 88 protrudes horizontally outwardly through one side of the housing 87 for connection with the pumping member rotor, as explained below.

Mounted on the side of the housing 87 is the pump head 90 which comprises a cantilevered tube anchoring block 92, a shaft bearing arm 94, and two power driven rotors 96 each having three eccentrically spaced pumping members 98. The rear edge 100 of the tube anchoring block 92 includes a series of—in the disclosed embodiment—six inflow stations 102, and the front edge 104 of the tube mounting block 92 includes a corresponding series of six outflow stations 106. As in the above described embodiment, each station comprises an open slot connected with the rear and front face, respectively, of the anchoring block so that pumping tubes may readily be inserted and removed manually with a gentle stretching and snap action.

The upper face of the anchoring block 92 includes a first lateral cross-channel 108 which is slightly wider than the base of the tube anchoring slots, and a second cross-channel 110 having a width approximately the same as the base of the tube anchoring slots 106. The slots are each flared smoothly outward at their lower end to avoid sharp corner contact with the pumping tubes.

As in the above described embodiment, each opposed inflow and outflow station secures one end of a pumping tube 112, each tube being connected at its inflow end with an inflow conduit and at its outflow end with an outflow conduit by means of flanged fittings fixed thereto having lateral protrusions which cooperate with the cross-channels 108, 110 to prevent both axial and rotary motion of the pumping tube 112 relative to the anchoring block 92.

The power driven rotor 96 comprises a pair of end plate portions 114, and the pump illustrated in FIG. 8 includes two such rotors. The end plate portions 114 of each rotor have three pumping members 98 eccentrically spaced therebetween. Each pumping member 98 includes roller means having at least three axially spaced tube-depressing portions, each such portion having a convex tube-centering configuration whereby each of the twin rotors 96 is capable of operating three pumping tubes enabling the pump illustrated in FIG. 8 to accommodate up to six separate fluids at six separate rates, simultaneously. The rotors 96 are each secured to the drive shaft 88 as it 116.

Operation of the pump illustrated in FIG. 8 is similar to that described above, and each of the six pumping tubes may easily be inserted in or removed from the anchoring block 92 with an easy manual motion which permits other pumping stations to continue operation without interruption.

There has thus been disclosed a roller pump head which provides for extremely easy, rapid, fool-proof manipulation of the pumping tubes to insure pump operation even in the most sensitive environments encountered in the medical field.

While the above described embodiments constitute the presently preferred mode of practicing this invention, other embodiments and equivalents are included within the scope of the actual invention, which is claimed is:

1. A pump comprising a base, a readily replaceable resilient tube anchored between an inflow station on the base and an outflow tsation on the base, and at least one pumping member mounter on the base for travel *in a substantially flat plane* in uni-directional depressing contact with the tube along a portion of its length between the inflow station and the outflow station, the inflow station including easily accessible structure forming a longitudinal slot, *the main plane through the slot being non-parallel with the plane of travel of the pumping member,* the outer longitudinal end of the slot meeting a lateral shoulder against which a flanged fitting fixed on the resilient tube may be received to anchor the inflow end of the tube against inward axial motion, the inner longitudinal end of the slot flaring smoothly outward to avoid sharp corner contact with the tube in the slot, the width of the slot along its base being at least slightly greater than the width of the tube so that the tube is freely received therein, and the slot remote from its base being slightly narrower than the width of the tube so that the tube is normally retained along the base of the slot and whereby the flexible tube may be moved laterally into and out of the slot with an easy manual action.

2. A pump as in claim 1 wherein the lateral shoulder is at the base of a lateral cross-channel intersecting the outer longitudinal end of the slot and the flanged fitting fixed on the tube includes a lateral projection which cooperates with the lateral cross-channel to prevent axial rotation of the tube relative to the slot.

3. A pump as in claim 2 wherein the outflow station includes easily accessible structure forming a slot similar to and spaced from the inflow station slot, the lateral cross-channel intersecting the outer end of the inflow station slot having a different width than the lateral cross-channel intersecting the outer end of the outflow station slot whereby different lateral projections on the flanged fittings fixed on the inflow end and the outflow end of the tube cannot be improperly received in the cross-channels.

4. A pump as in claim 1 wherein a plurality of pumping members are eccentrically spaced on a power driven rotor mounted for continuous rotation relative to the base and the resilient tube is stretched around the pumping members and is otherwise unsuported between the inflow station and the outflow station.

5. A pump as in claim 4 wherein the outflow station includes easily accessible structure forming a slot similar to the inflow station slot, the two slots being arranged substantially parallel to each other and spaced apart a distance no greater than three times the radial eccentricity of the pumping members on the power driven rotor, the base of each slot lying in a common plane which is substantially perpendicular to the rotor axis.

6. A pump as in claim 5 wherein the power driven rotor comprises a single plate portion having a central boss, an axial aperture therein for receiving one end of a drive shaft, and a detent arrangement for releasably securing the rotor to the drive shaft, the pumping members being secured to the plate portion.

7. A pump as in claim 6 wherein the power driven rotor includes three pumping members eccentrically spaced around the plate portion, each pumping member including roller means having first and second axially spaced tube-depressing portions, each such portion having a convex tube-centering configuration.

8. A pump as in claim 5 wherein two resilient tubes are each anchored at separate inflow stations and outflow stations positioned on opposite sides of the rotor, one tube being stretched around the first tube-depressing portions of the roller means and the other tube being stretched around the second tube-depressing portions of the roller means whereby unbalanced lateral strain on the rotor axis is minimized and two separate fluids may be pumped simultaneously.

9. A pump as in claim 5 wherein the power driven rotor comprises a pair of end plate portions mounted for rotation on the base, three pumping members eccentrically connected between the end plate portions, each pumping member including roller means, having at least three axially spaced tube-depressing portions, each such portion having a convex tube-centering configuration, and at least three resilient tubes each anchored at separate inflow stations and outflow stations positioned adjacent the rotor, each tube being stretched around its corresponding tube-depressing portions of the roller means whereby three separate fluids may be pumped simultaneously.

10. A pump as in claim 2 wherein the tube including he lateral projection on at least the inflow end is molded o length from silicone rubber.

References Cited

The following references, cited by the Examiner, are of record in the patented file of this patent or the original patent.

UNITED STATES PATENTS

| | | | |
|---|---|---|---|
| 3,463,092 | 8/1969 | Meyer | 417—477 |
| 2,406,485 | 8/1946 | Arnold | 103—149 |
| 2,693,765 | 11/1954 | Petri | 103—149 |

| | | | |
|---|---|---|---|
| 3,138,104 | 6/1964 | Cantor | 103—149 |
| 3,140,666 | 7/1964 | Currie | 103—149 |
| 3,172,367 | 3/1965 | Kling | 103—149 |
| 3,353,491 | 11/1967 | Bastian | 103—149 |
| 3,402,673 | 9/1968 | Ballentine et al. | 103—149 |

OTHER REFERENCES

Proceedings of the Physiological Society, Nov. 6–7, 1964, Journal of Physiology, pp. 117, 6–8.

CARLTON R. CROYLE, Primary Examiner

R. E. GLUCK, Assistant Examiner